UNITED STATES PATENT OFFICE.

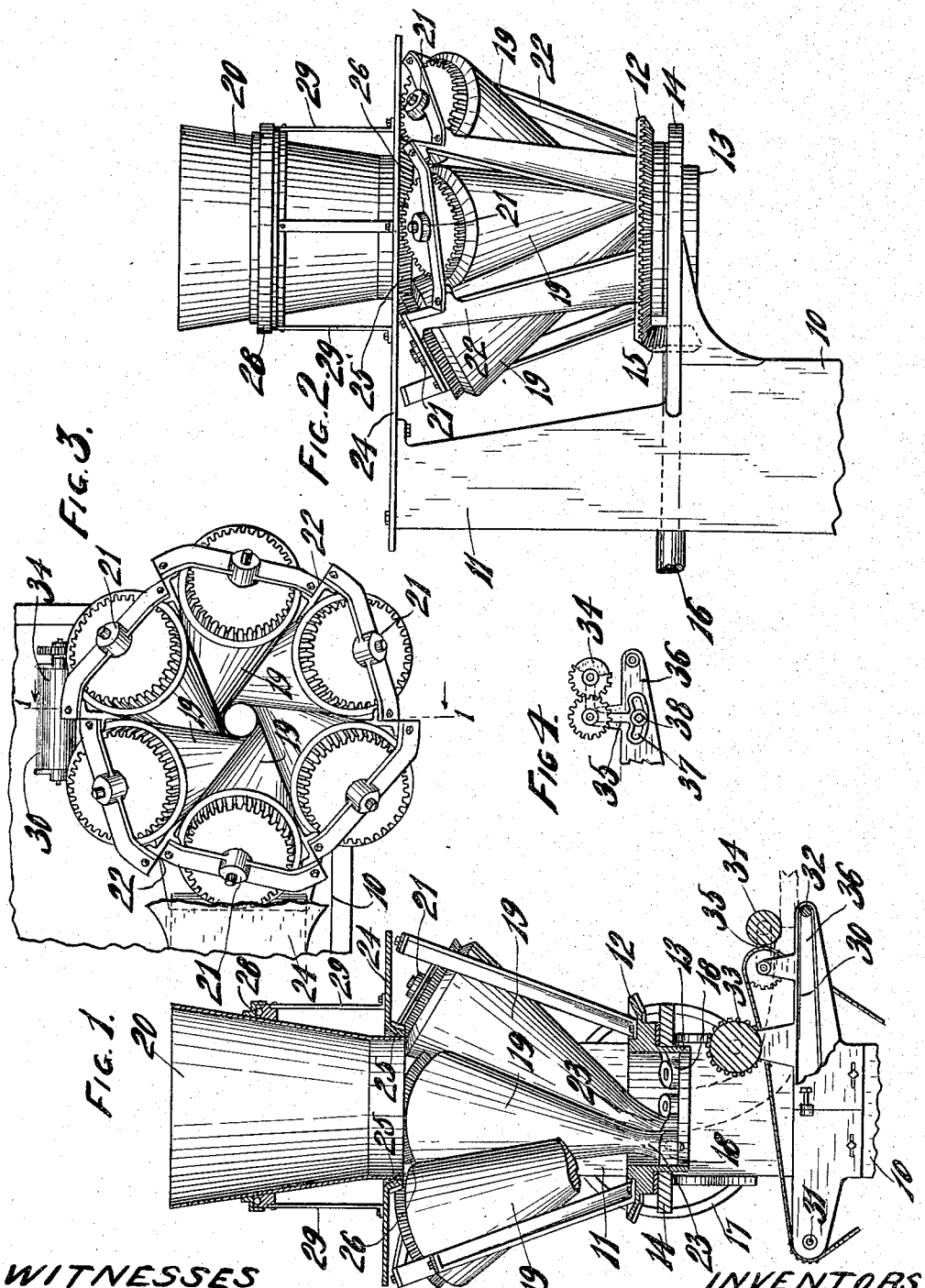

HERMAN HAYSSEN AND ARTHUR H. HAYSSEN, OF SHEBOYGAN, WISCONSIN.

DOUGH-FEEDING MACHINE.

1,166,519.
Specification of Letters Patent.
Patented Jan. 4, 1916.

Original application filed May 25, 1910, Serial No. 563,296. Divided and this application filed April 10, 1912. Serial No. 689,740.

*To all whom it may concern:*

Be it known that we, HERMAN HAYSSEN and ARTHUR H. HAYSSEN, citizens of the United States, and residents of Sheboygan, in the county of Sheboygan and State of Wisconsin, have invented new and useful Improvements in Dough-Feeding Machines, of which the following is a description, reference being had to the accompanying drawings, which are a part of this specification.

This invention relates to improvements in dough feeding machines particularly adapted for feeding dough to weighing and dividing machines used in bakeries or other places where large quantities of loaves of bread are baked.

In the modern bakeries machines are used for weighing and dividing the dough into pieces of uniform weight and in order to expedite the operation it is desirable to roll the batch of dough to a certain convenient size and then feed the rolled dough to the weighing and dividing machine.

It is one of the objects of this invention to provide a dough feeding machine which is adapted to form dough into a roll of a certain convenient size and to feed said roll in a continuous stream to a weighing and dividing machine.

A further object of the invention is to provide a dough feeding machine which is simple in construction and operation and in which the roller mechanism is adapted to roll the batch of dough into form and to also advance the same.

With the above and other objects in view, the invention consists of the improved dough feeding machine and its parts and combinations as set forth in the claims, and all equivalents thereof.

In the accompanying drawing in which the same reference characters indicate the same parts in all of the views: Figure 1 is a vertical sectional view of the improved dough feeding machine taken on line 1—1 of Fig. 3, a portion of the supporting frame being omitted; Fig. 2 is an end elevation thereof; Fig. 3 is a top view of the dough feeding machine with the upper portion of the machine removed to show parts thereunderneath; and Fig. 4 is a detail view of a portion of the machine.

Referring to the drawing the numeral 10 indicates the supporting frame of the dough feeding machine which is provided with a standard 11 upon which is mounted the feeding mechanism. A bevel gear 12 provided with a tubular hub portion 13 depending therefrom is journaled in a projection 14 extending at an angle forwardly from the standard 11. This bevel gear 12 is driven by means of a bevel pinion 15 carried by the main drive shaft 16 which is journaled on the standard 11 and is provided with a belt wheel 17 for belted connection with a source of power. The bevel gear 12 has extending inwardly therefrom bearing lugs 18 in which are journaled conical feed rollers 19. These feed rollers extend upwardly and outwardly at an angle and form a funnel shaped spout to receive the batch of dough from the revoluble hopper 20 mounted above the said feed rollers. The upper and larger ends of these feed rollers are journaled in bearings 21 carried by arms 22 extending upwardly from the bevel gear 12. The feed rollers are also positioned at a tangent with relation to the axis of the bevel gear 12 with the lower ends of the feed rollers extending in advance of the upper ends of said rollers in the direction of rotation of the bevel gear 12. These rollers are formed with slightly enlarged portions 23 so that their adjacent peripheries will just clear each other and form a spout substantially closed on the sides. A hopper plate 24 bolted to the standard 11 and extending over the feed rollers is provided with an opening 25 and with a depending annular flange 25' surrounding said opening and into which extends the lower end of the revoluble hopper 20. The outer periphery of the depending annular flange is provided with gear teeth 26 which are in mesh with gears 27 carried on the upper ends of the feed rollers to cause the rotation of said rollers while they are revolving with the bevel gear 12, thus providing a means for feeding the dough downwardly without rubbing or undue handling or working. The revoluble hopper 20 is supported by and has a ball bearing connection 28 with the hopper plate 24 to permit the free turning of the said hopper by contact with the batch of dough which is being turned by the feed rollers. The ball bearing connection is supported on arms 29 extending upwardly from the hopper plate 24.

An endless apron 30 positioned beneath the discharge opening of the spout and mounted on rollers 31 and 32 is adapted to receive the dough discharged in a flexible, cylindrical, continuous stream carrying it to the cutting and weighing mechanism (not shown) of a dough weighing and dividing machine. A guide roll 33 positioned above the endless feed apron serves to guide the dough in proper position on the apron and prevents the apron from drawing the dough at an angle against the side of the discharge end of the spout. A roller 34 adjustably mounted above the feed apron 30 near the outer end thereof is adapted to flatten the cylindrical stream of dough and regulate the thickness of the mass discharged therebeneath. The adjustable roller is journaled in the outer ends of the upper arms of the bell crank levers 35 mounted on the support 36 of the apron. The lower arms of these bell crank levers are provided with segmental elongated slots 37 through which extend bolts 38 to clamp the bell crank levers to the support when the roller has been adjusted to the height desired above the apron 30.

In operation a batch of dough is placed in the hopper and in the spout and the revoluble cone shaped rollers forming the walls of the spout will converge and draw the dough downwardly, due to their angular and tangential position with relation to the axis of the spout. The dough will be discharged from the spout in a continuous stream, cylindrical in form, and will fall and lie prone upon the endless apron. The apron will carry the continuous stream of dough forwardly and in moving forward the dough will pass beneath the guide roller and the adjusted roller and will be flattened thereby and be discharged from the apron in a most convenient form to be weighed and divided into pieces to form loaves.

From the foregoing description it will be seen that the dough feeding machine is simple in construction and operation and is well adapted to feed dough in a continuous stream without rubbing or undue handling.

It is to be understood that this invention is not limited to any specific form or arrangement of parts except in so far as such limitations are specified in the claims.

This case constitutes a division of our application for Letters Patent for improvements in dough weighing and dividing machines, filed May 25, 1910, and bearing Serial No. 563,296.

What we claim as our invention is:

1. A dough feeding machine, comprising a revoluble cylindrical hopper, a revoluble spout provided with a discharge opening and positioned beneath the hopper and consisting of a plurality of conical rollers extending upwardly and outwardly at an angle and also at a tangent with relation to the discharge opening and having enlargements at their lower ends.

2. A dough feeding machine, comprising a revoluble cylindrical hopper, a revoluble spout provided with a discharge opening and positioned beneath the hopper and consisting of a plurality of conical rollers extending upwardly and outwardly at an angle and also at a tangent with relation to the discharge opening, and having enlargements at their lower ends and means for rotating the spout and independently rotating the rollers.

3. A dough feeding machine, comprising a revoluble cylindrical hopper, a revoluble frame positioned beneath the hopper and provided with a gear having an opening, a plurality of conical rollers journaled in the frame and extending upwardly and outwardly at an angle and also positioned at a tangent with relation to the opening of the gear, the said rollers having enlargements formed on their lower ends means for rotating the frame, and means for rotating the rollers.

4. A dough feeding machine, comprising a revoluble cylindrical hopper, a revoluble frame positioned beneath the hopper and provided with a gear having an opening, a plurality of conical rollers journaled in the frame and extending upwardly and outwardly at an angle and also positioned at a tangent with relation to the opening of the gear, the said rollers having enlargements formed on their lower ends means for rotating the frame, gears carried by the rollers, and a stationary gear with which the roller gears are in mesh.

5. A dough feeding machine, comprising a revoluble cylindrical hopper, a revoluble spout provided with a discharge opening and positioned beneath the hopper and consisting of a plurality of conical rollers extending upwardly and outwardly at an angle, and having enlarged lower ends means for rotating the spout and independently rotating the rollers, an endless belt positioned beneath the revoluble spout to move the cylindrically formed stream of dough discharged from the spout, and a roller for flattening the cylindrical form of dough.

6. A dough feeding machine, comprising a revoluble cylindrical hopper, a revoluble spout provided with a discharge opening and positioned beneath the hopper and consisting of a plurality of conical rollers extending upwardly and outwardly at an angle and also positioned at a tangent with relation to the discharge opening, the said rollers having enlargements formed on their lower ends means for rotating the spout and independently rotating the rollers, an endless belt positioned beneath the revoluble spout to move the cylindrically formed stream of dough discharged from the spout, and a roller for flattening the cylindrical form of dough.

7. A dough feeding machine, comprising a revoluble cylindrical hopper, a revoluble spout provided with a discharge opening and positioned beneath the hopper and consisting of a plurality of conical rollers extending upwardly and outwardly at an angle and also positioned at a tangent with relation to the discharge opening, the said rollers having enlargements formed on their lower ends means for rotating the spout and independently rotating the rollers, an endless belt positioned beneath the revoluble spout to move the cylindrically formed stream of dough discharged from the spout, a roller extending transversely across and above the belt to guide the stream of dough, and a roller extending transversely across and above the belt to flatten the cylindrical form of dough carried by the belt.

In testimony whereof, we affix our signatures, in presence of two witnesses.

HERMAN HAYSSEN.
ARTHUR H. HAYSSEN.

Witnesses:
WM. H. GRUBE,
JANE P. HAYSSEN.

Copies of this patent may be obtained for five cents each, by addressing the "Commissioner of Patents, Washington, D. C."